United States Patent [19]

Salmon

[11] Patent Number: 4,715,502
[45] Date of Patent: Dec. 29, 1987

[54] TELEPHONE EQUIPMENT RACK

[75] Inventor: Garland R. Salmon, Durham, N.C.

[73] Assignee: Newton Instrument Company, Butner, N.C.

[21] Appl. No.: 831,165

[22] Filed: Feb. 20, 1986

[51] Int. Cl.⁴ ............................................. A47F 5/00
[52] U.S. Cl. .................................... 211/26; 211/175; 211/182; 211/189
[58] Field of Search ................ 211/26, 182, 189, 175, 211/193

[56] References Cited

U.S. PATENT DOCUMENTS

| | | | |
|---|---|---|---|
| 1,272,175 | 7/1918 | Albright | 211/175 X |
| 1,957,656 | 5/1984 | Langenkamp et al. | 211/182 |
| 2,877,602 | 3/1959 | Larsen | 211/175 |
| 3,602,373 | 8/1971 | Cassel | 211/175 |
| 4,126,288 | 11/1978 | DeSisto et al. | 211/182 X |
| 4,493,422 | 1/1985 | Kaegebein | 211/26 |
| 4,497,411 | 2/1985 | DeBortoli | 211/26 |
| 4,519,013 | 5/1985 | Breeze et al. | 211/26 X |
| 4,641,754 | 2/1987 | Hebel et al. | 211/26 |

Primary Examiner—Robert W. Gibson, Jr.
Attorney, Agent, or Firm—B. B. Olive

[57] ABSTRACT

A telephone equipment rack is made up of a pair of U-shaped frame members, each of which is formed of an integral strip of channel of U-shaped cross section adjustably joined so that either of two frame widths can be obtained with the same frame members. Base plates secured to the sides of the frame in perpendicular relation support the frame and resists tipping in either of the two frame widths.

2 Claims, 15 Drawing Figures

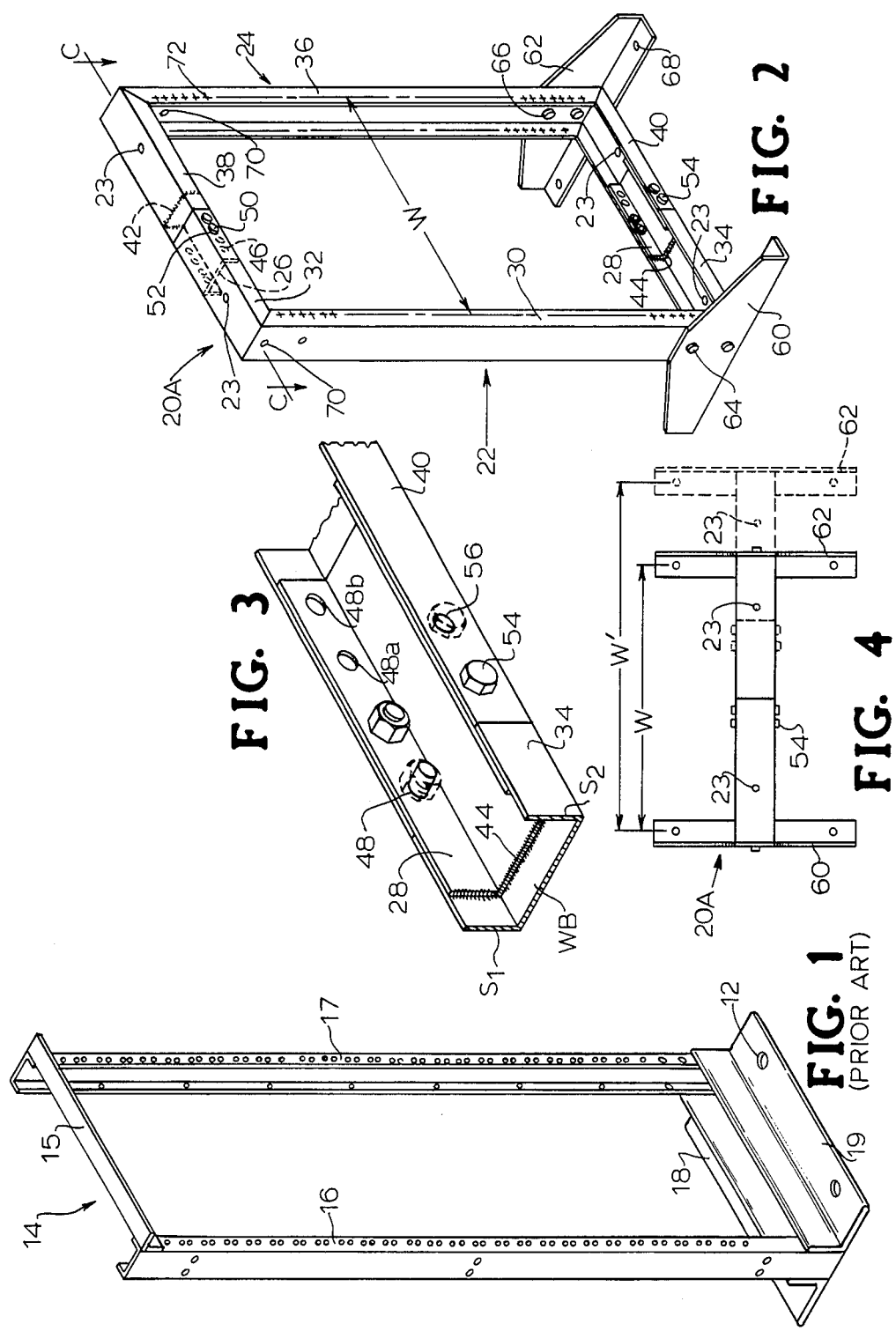

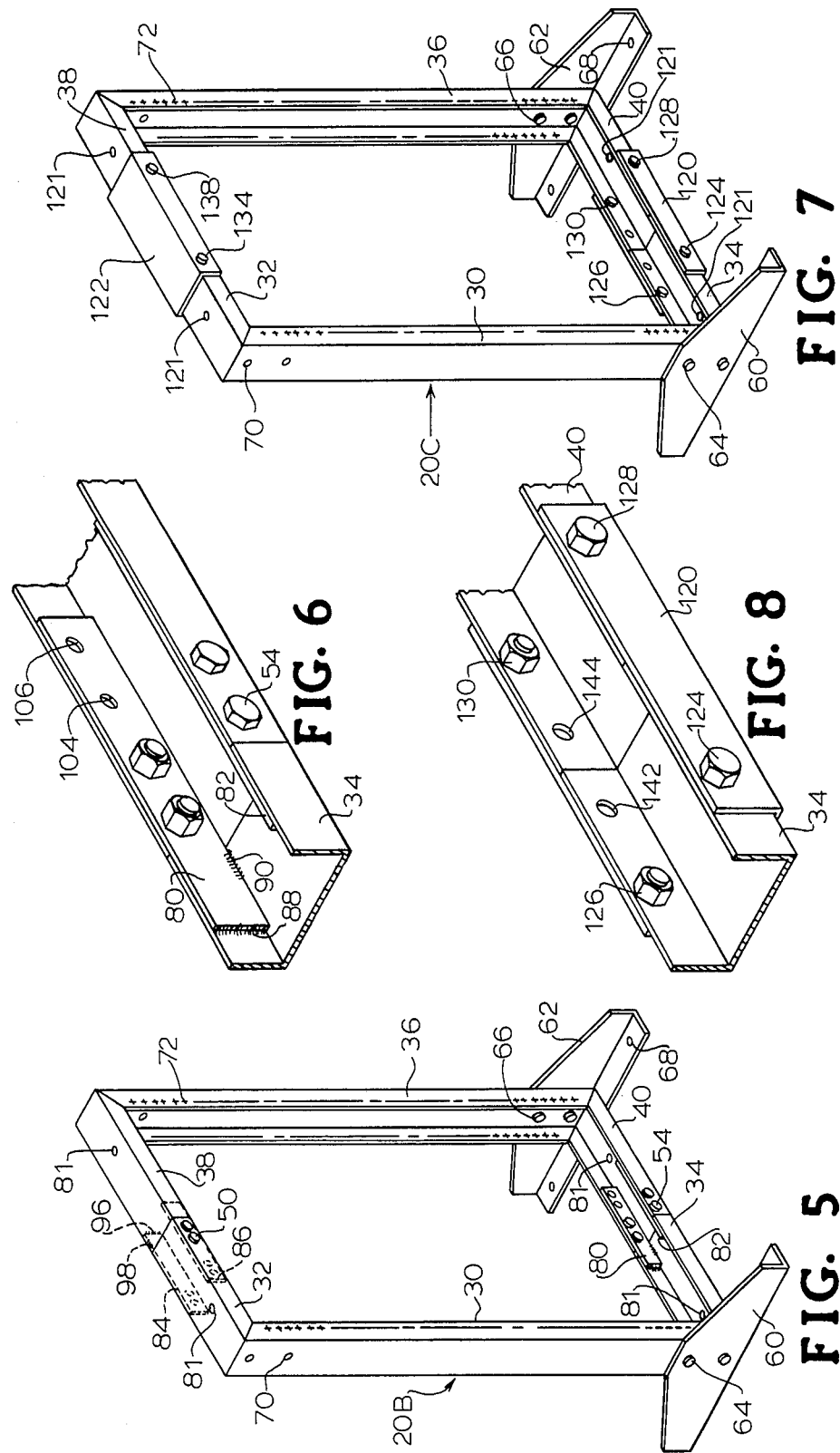

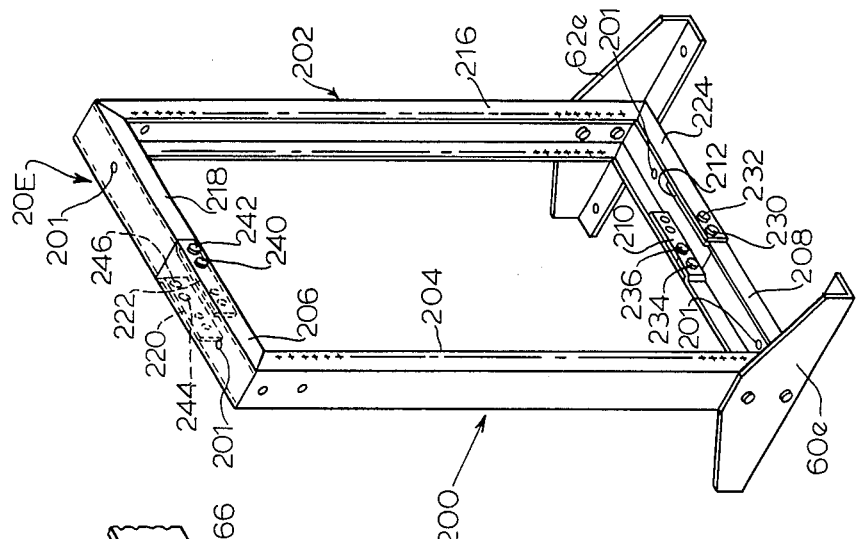
FIG. 11
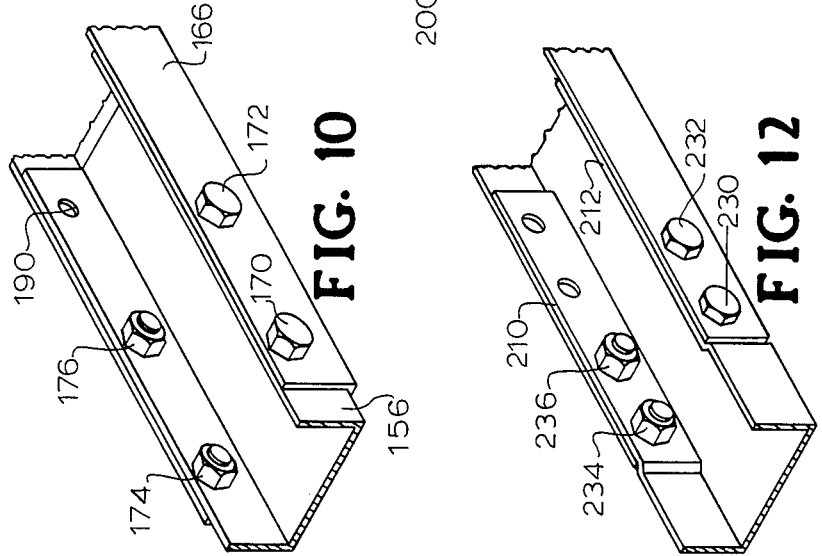
FIG. 10
FIG. 12
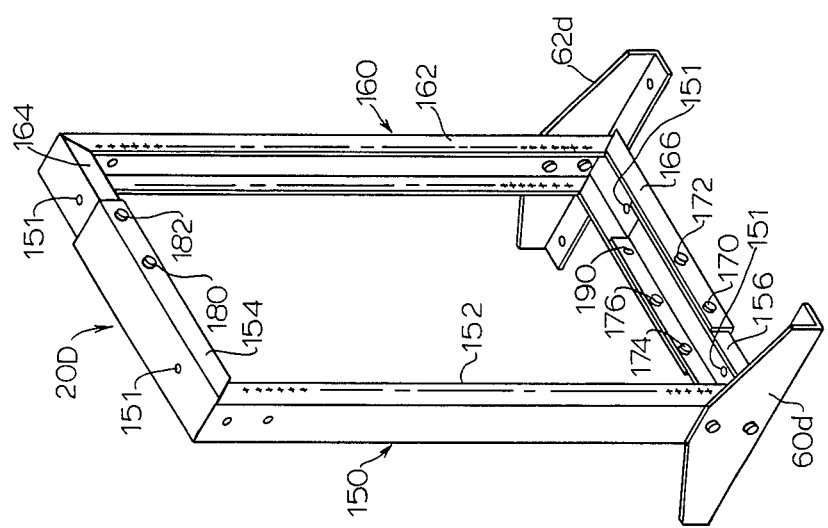
FIG. 9

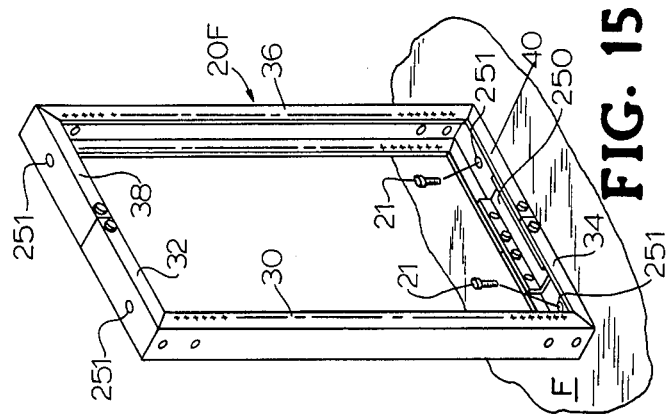
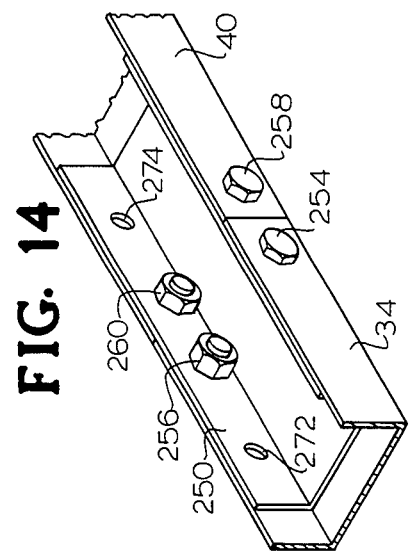
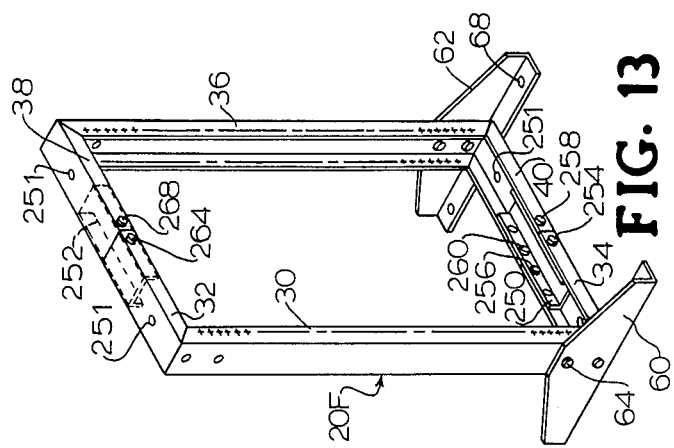

TELEPHONE EQUIPMENT RACK

DESCRIPTION

TECHNICAL FIELD

The invention relates to racks and specifically to racks for mounting telephone equipment.

BACKGROUND ART

Telephone equipment racks for mounting communication equipment and apparatus have conventionally comprised rectangular frames made of aluminum or steel with no width adjustability. Telephone companies have in general required the telephone equipment racks to be of what is conventionally referred to as a 19" width or a 23" width. This width refers to the approximate distance on a horizontal line between centers of a pair of opposed holes at a given level on the front or rear face of the vertical uprights forming the sides of the telephone equipment rack. The conventional channel uprights on the sides of the rack have been either welded or bolted to one or more connecting base plates extending between the uprights at the bottom of the rack and to a connecting bar extending between the uprights at the top of the rack. The connecting bar at the top, the connecting base plates at the bottom, and the uprights have all been separately fabricated. Furthermore, the rack has been available in only one width, i.e., in either a so-called 19" rack or a so-called 23" rack. There has not been available a rack which could be contracted to the 19" width or expanded to the 23" width. Thus, it would be desirable to provide a rack construction which would allow the rack to be expanded to a 23" width or contracted to a 19' width so as to meet the needs for both widths in the industry. Further, it would be desirable to provide such an adjustable rack in which it was not required to separately fabricate and bolt or weld connector bars to the uprights. The object of the invention thus becomes that of providing such a rack to meet a need which has existed for at least 25 years in the industry.

DISCLOSURE OF INVENTION

The improved telephone equipment rack of the invention is illustrated in six embodiments. All of the embodiments have the common characteristic of providing a telephone equipment rack which can be expanded to one width or contracted to another width using the same uprights, the same base plates, and the same top and bottom connecting members forming part of the rack. Means are provided for each embodiment wherein the vertical uprights can be spaced apart either for the requirements of a relatively wide width, e.g., a 23" rack, or for the requirements of a relatively narrow width, e.g., a 19" rack. Stability for the rack, so as to prevent it from tilting either forward or backward once mounted, is provided by a pair of opposed angled base plates secured on opposed sides of the rack and extending generally perpendicular to the plane of the rack. Inwardly turned and connected portions of the uprights eliminate the need to provide connector bar and base plates between the uprights. In an alternative arrangement, the invention rack is bolt secured to the floor without using base plates.

DESCRIPTION OF THE DRAWINGS

FIG. 1 is a perspective view of a prior art rack.

FIG. 2 is a perspective view of an improved rack according to a first embodiment of the invention.

FIG. 3 is a detailed enlargement of one of the expandable sections of the improved rack with selected parts in dashed lines for illustration.

FIG. 4 is a top plan view of the rack of FIG. 2.

FIG. 5 is a perspective view of an improved rack according to a second embodiment.

FIG. 6 is an expanded detailed view of one of the expandable sections of the rack of FIG. 5.

FIG. 7 is a perspective view of an improved rack according to a third embodiment.

FIG. 8 is an enlarged view of one of the expandable section of the rack of FIG. 7.

FIG. 9 is a perspective view of an improved rack according to a fourth embodiment of the invention.

FIG. 10 is an enlarged view of one of the expandable sections of the rack of FIG. 9.

FIG. 11 is a perspective view of an improved rack according to a fifth embodiment of the invention.

FIG. 12 is an enlarged view of one of the expandable sections of FIG. 11.

FIG. 13 is a perspective view of an improved rack according to a sixth embodiment of the invention.

FIG. 14 is an enlarged view of one of the expandable sections of the rack of FIG. 13.

FIG. 15 is a perspective view of the rack of FIG. 13 illustrating how the rack may be secured to the floor with bolts and without use of the base plates.

BEST MODE FOR CARRYING OUT THE INVENTION

As illustrated in FIG. 1 for reference, the prior art non-adjustable telephone rack 14 incorporates a separately-fabricated, non-adjustable top connector bar 15 bolted or welded to and extending between non-adjustable uprights 16, 17 and non-adjustable base plates 18, 19 with floor securing bolt holes 12. Base plates 18, 19 are bolted or welded to and extend between uprights 16, 17. It is this type of rack which the invention seeks to improve.

Referring next to FIGS. 2–4 and the first embodiment, of the invention, the improved rack 20A of the invention comprises an integral U-shaped frame member 22 adjustably joined to an integral U-shaped frame member 24 of similar construction by means of an internally-nested upper channel connector 26 and a similarly-formed, internally-nested lower channel connector 28. Frame member 22 comprises an upright vertical side channel 30 and respective top and bottom horizontal channels 32, 34, all formed from a single bent channel piece. Such channels are formed by the typical web WB and sides $S_1$, $S_2$ of U-shaped cross section as in FIG. 3. Frame member 24 of similar construction comprises an upright vertical side channel 36 and respective top and bottom horizontal channels 38, 40, also formed from a single bent channel piece. Upper channel connector 26 is welded at one end by weld 42 to channel 38 and lower channel connector 28 is welded at one end by weld 44 to channel 34. The non-secured end of upper channel connector 26 when not bolted in place is free to slide within channel 32. Likewise, the non-welded end of lower channel connector 28 when not bolted is free to slide in channel 40. The sides of the channels forming the various frame members and connectors are all inwardly directed.

Upper channel connector 26 is provided with four bolt holes 46 and lower channel connector 28 is provided with four bolt holes 48. It will be noted both in regard to the upper channel connector 26 as well as the lower channel connector 28 that one pair of such bolt holes is located closer to the center of the rack 20A than is the other pair of bolt holes. A pair of nut-secured bolts 50 passing through holes 52 in top channel 32 adjustably secure upper channel connector 26 to top channel 32. Another pair of bolts 54 passing through holes 56 in lower channel connector 28 secure lower channel connector 28 to bottom channel 40. Frame stability is provided by base plates 60, 62 secured by corresponding bolts 64, 66 passing through holes, not shown, provided in the respective side channels 30, 36. Alternatively, if the rack is inverted from the FIG. 2 position, holes 70 may be employed for securing base plates 60, 62. Base plates 60, 62 of similar shape extend generally perpendicular to the central plane C—C (FIG. 2) of rack 20A and may be secured to the floor by appropriate screws or bolts installed in base plate holes 68. Alternatively, rack 20A may be bolted to the floor using bolts 21 (FIG. 15) through bolt holes 23 (FIG. 2) and without use of the base plates 60, 62 as further illustrated in FIG. 15.

Rack 20A is shown in FIGS. 2, 3 and 4 adjusted for its narrowest width W, e.g., a conventionally so-called 19" rack. However, it will be readily apparent that if the respective upper and lower channel connectors 26, 28 and the corresponding bolts 50, 54 are repositioned to allow use of the alternative set of outermost illustrated holes, e.g., holes 48a, 48b, the upright channels 30, 36 can be spread apart to the wider width W', i.e., to obtain the conventional so-called 23" rack. Thus, in comparison to the prior art rack of FIG. 1 at least the following advantageous distinctions are seen:

1. Each side of the frame is made from a single piece of bent channel of similar construction.

2. The same basic rack can be adjusted to meet the requirements of either a 19" rack or a 23" rack as required in trade practice.

3. Base plates 60, 62 are mounted in such a way as to not interfere with the desired rack adjustability and without requiring any re-bolting of the base plates themselves. The rack can be inverted from the position shown and the base plates mounted at the opposite end.

4. Each of the integral U-shaped parts of the frame and welded-on connectors can be made of essentially identical construction and bolted together to the desired frame width.

5. The overall frame construction of the invention is suited to being shipped broken down in a highly compact nested arrangement thus minimizing transportation cost.

6. Conventional cable brackets may be readily attached utilizing holes 70. Likewise, holes 72 at conventional vertical spacing provide for attachment of equipment shelves, terminal block mounting bars, and the like. Holes 23 allow the rack to be floor secured as in FIG. 15 without use of the base plates.

7. Spare rack inventory is reduced for both the manufacturer and the user.

8. Tooling and fabrication costs are reduced by reason of the symmetry of the parts.

The second embodiment of the modified rack 20B illustrated in FIGS. 5 and 6 uses a pair of connector plates 80, 82 in place of the channel connector 28 in FIG. 2 and a separate set of connector plates 84, 86 in place of channel connector 26. Connector plate 80 is secured by means of welds 88, 90 to channel 34 and connector plate 82 is secured by a comparable set of welds 92, 94 (not shown). Connector plate 84 is secured to channel 38 by a comparable set of welds 96, 98 and connector plate 86 is also secured to channel 38 by a corresponding set of welds 100, 102, not shown. The respective connector plates 80, 82, 84 and 86 are provided with inner and outer pairs of bolt holes for receiving the respective bolts 50, 54 in either the conventional 19" configuration as illustrated in FIGS. 5 and 6 or by using the corresponding outer pair of holes, e.g., holes 104, 106, the modified frame 20B can be expanded to the relatively wide width, i.e., conventional 23" rack. Floor securing bolt holes 81 are utilized as previously explained in connection with FIG. 15. The previously-explained advantages are thus retained in this second embodiment.

In the third embodiment, rack 20C illustrated in FIGS. 7 and 8, the welded internally-nested channel connectors 26, 28 of FIGS. 2–4 are replaced by a pair of externally-applied channel connectors 120, 122. Channel connector 120 is secured as in FIG. 7 for the conventional 19" rack width by means of bolts 124, 126 securing connector 120 to channel 34 and a similar pair of bolts 128, 130 securing channel 40 to channel connector 120. In a similar manner, bolts 134, 136 (not shown) secure channel connector 122 to channel 32 and bolts 138, 140, (not shown) secure connector 122 to channel 38. For obtaining the wider width, i.e., the conventional 23" rack, the respective bolts 124, 126, 128, 130, 134, 136, 138 and 140 are removed and the respective uprights 30, 36 are spread apart until the mentioned bolts can be repositioned into those holes, e.g., holes 142, 144, corresponding to the wider width. The respective channels 34, 40, 32 and 38 are each formed with four holes to facilitate such expansion to the wider 23" width when required. Floor securing bolt holes 121 are used as previously explained.

In a fourth embodiment, rack 20D comprises an integral U-shaped frame member 150 having an upright vertical side channel 152 and respective top and bottom horizontal channels 154, 156, all formed from a single bent channel piece. Frame member 160 also comprises an integral U-shaped frame member having an upright vertical side channel 162, a top horizontal channel 164 nested within channel 154 and a bottom channel member 166 in which channel 156 is nested. Channel 156 is adjustably secured to channel 166 by means of bolts 170, 172, 174 and 176. In a like manner, channel 164 is secured to channel 154 by means of bolts 180, 182, and bolts 184 and 186 (not shown). Channel 156 is formed with three pairs of holes 190 and in a similar manner channel 164 is formed with three pairs of holes 192, not shown. For the relatively narrow width, i.e., 19" rack, the respective U-shaped frames 150, 160 are bolted together as illustrated in FIGS. 9 and 10. For the relatively wider width, i.e., the 23" rack, the mentioned bolts 170, 172, 174, 176, 180, 182, 184 and 186 are removed and the uprights 152, 162 are spread apart so as to allow the mentioned bolts to be repositioned in those sets of holes corresponding to such wider width. Base plates 60d, 62d are secured and employed, as previously explained. Floor bolt securing holes 151 are provided for use as previously referred to and as illustrated in FIG. 15. Again, all of the previously-mentioned advantages are retained.

In a fifth embodiment, the modified rack 20E comprises an integral U-shaped frame member 200 joined to an integral U-shaped frame member 202. Frame member 200 includes an upright vertical side channel 204, a top channel 206, and a bottom channel 208 having a pair of nested connector plate extensions 210, 212. Frame member 202 comprises an upright channel 216, a horizontal top channel 218 having a pair of plate connector extensions 220, 222 nested within channel 206 and a bottom channel 224. The connector plate extensions 210, 212 are provided with four sets of bolt holes for receiving bolts 230, 232, 234 and 236 for connecting channel 208 to channel 224. A comparable set of bolts 240, 242, 244 and 246 are employed to connect channel 218 to channel 206. From prior description, it will be appreciated that the relatively narrow width or 19" width rack is obtained by connecting the frame members 200, 202 in the manner shown in FIGS. 11 and 12. The relatively wide or 23" width rack is obtained by removing the mentioned bolts 230, 232, 234, 236, 240, 242, 244 and 246 and repositioning the respective frame members 200, 202 such that the mentioned bolts can go in the pairs of holes corresponding to the wider width. Base plate 60e, 62e are secured and employed, as previously explained. Floor bolt securing holes 201 are provided for use as previously explained. Again, all of the previously mentioned advantages are retained.

In the sixth embodiment rack 20F, illustrated in FIGS. 13-14, the externally applied channel connectors 120, 122 of FIGS. 7-8 are replaced by a pair of internally nested channel connectors 250, 252 (shown in dashed lines). Channel connector 250 is secured as in FIG. 9 for the conventional 19" rack width by means of bolts 254, 256 securing connector 250 to channel 34 and a similar pair of bolts 258, 260 securing channel 40 to channel connector 250. In a similar manner, bolts 264, 266 (not shown) secure channel connector 252 to channel 32 and bolts 268, 270 (not shown) secure connector 252 to channel 38. For obtaining the wider width, i.e., the conventional 23" rack, the respective bolts 254, 252, 258, 260, 264, 266, 268 and 270 are removed and the respective uprights 30, 36 are spread apart until the mentioned bolts can be repositioned into those holes, e.g., holes 272, 274, corresponding to the wider width. The respective channels 34, 40, 32 and 38 are each formed with four holes to facilitate such expansion to the wider 23" width when required. Bolt securing holes 251, receiving bolts 21 (FIG. 15) may be used to secure the rack 20F to the floor F as in FIG. 15 eliminating the need for the base plates 60, 62.

What is claimed is:

1. A rectangular, adjustable size telephone equipment rack comprising, in combination:
    (a) a first U-shaped frame member formed of an integral strip of metal channel comprising a web and sides of U-shaped cross section and having a first vertical channel-formed side portion joined to horizontally-opposed channel-formed first top and first bottom portions oriented perpendicular to said first side poriton and with the respective sides of the channel forming said side, top and bottom portions being inwardly directed;
    (b) a second U-shaped frame member of shape and size mating that of said first frame member and formed of an integral strip of metal channel comprising a web and sides of U-shaped cross section and having a second vertical channel-formed side portion joined to horizontal opposed channel-formed second top and second bottom portions oriented perpendicular to said second side portion and with the respective sides of the channel forming said side, top and bottom portions being inwardly directed;
    (c) first connector means adjustably securing said first and second top channel portions together; and
    (d) second connector means adjustably securing said first and second bottom channel portions together, said first and second connector means each being formed of a U-shaped metal channel section with a web and sides nested within the web and sides of each of a pair of selected joined channel portions and adjustably bolt secured to both said joined channel portions and providing at least two positions in which said first and second top and bottom portions may be joined to provide frame width of corresponding different span.

2. A telephone equipment rack as claimed in claim 1 including first and second base plates formed of right-angled plate material secured to respective opposite lower outer sides of said first and second upright portions and extending perpendicular to the central frame of said plane enabling said rack to be self-supporting.

* * * * *